C. C. CROSMAN.
FISHING NET GEAR.
No. 62,481. Patented Feb. 26, 1867.
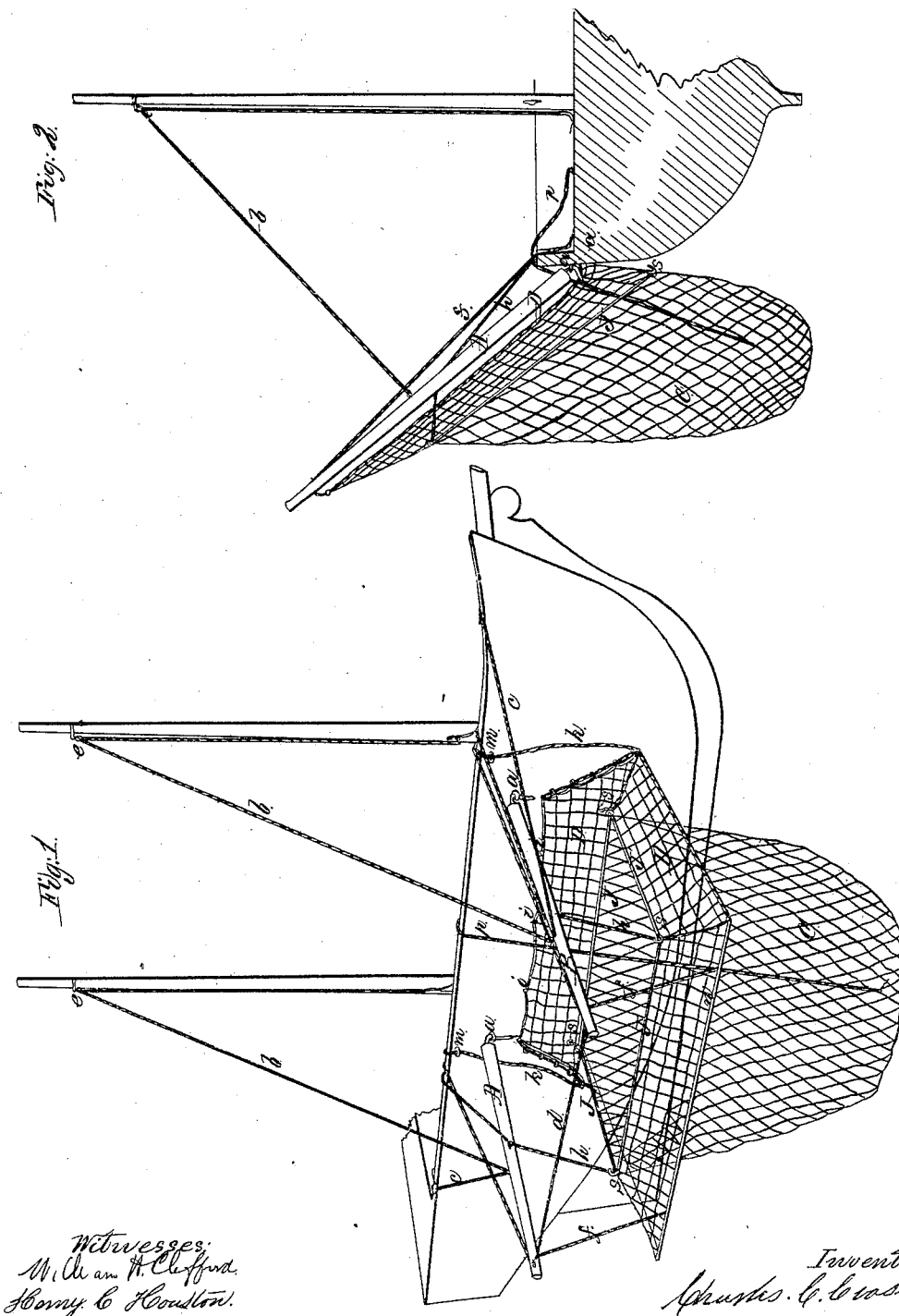

United States Patent Office.

CHARLES C. CROSMAN, OF PORTLAND, MAINE.

Letters Patent No. 62,481, dated February 26, 1867.

---

IMPROVEMENT IN FISHING-NET GEAR.

---

*The Schedule referred to in these Letters Patent and making part of the same.*

---

TO ALL WHOM IT MAY CONCERN:

Be it known that I, CHARLES C. CROSMAN, of Portland, in the county of Cumberland, and State of Maine, have invented a new and useful Fishing Gear; and I hereby declare the following to be a full, clear, and exact description thereof, which will enable others to make and use my invention, reference being had to the drawings accompanying this specification, and forming part of the same, in which—

Figure 1 shows a side elevation of a vessel with my gear attached.

Figure 2, an end elevation of the same.

The same letters refer to like parts in each of the figures.

My invention consists of a net attached to the side of a vessel by means of booms, lanyards, and hooks, as hereafter fully described.

A B show two booms projecting horizontally from the side of a vessel at right angles to the vessel's side, and secured thereto by hooks and staples, seen at $a$. Secured to these booms are the lines $b\ b$, the side stays $c\ c$, and the cross-stay $d$. By means of the lines $b\ b$ the booms can be raised up to a vertical position and lowered again. By the combined operation of the side stays $c\ c$ and the cross-stay $d$ the booms, when lowered by the lines $b\ b$, are held in the position shown in fig. 1. The cross-stay $d$ stretches from the outer end of one boom to the outer end of the other. The lines $b\ b$ pass through blocks or sheaves, $e$, on the masts, then down by the side of the masts, and are belayed near the bottom thereof, as seen in the drawing. The side stays are made fast on the vessel's rail. A net, such as is hereinafter described, is suspended from the booms A B by the lanyards $f\ f$, $h\ h$, and from the vessel's side by means of the hooks $i\ i\ i\ i$. The net is composed of two portions: first, the bag portion C, the mouth of which is held open when desired by the four rods J J, J' J', and second, the part which I call the flange, denoted at D. On the edge of that part of the flange which touches the side of the vessel, and which is held by the hooks $i\ i\ i\ i$, are two other lanyards, $k$. These are secured at the two outer of the hooks, $i\ i$, pass through the loops on the edge of the flange, as illustrated in the drawing, through the rings $m$, and are then made fast to belaying pins on the vessel's rail. These are employed to haul up the gore or corner of the flange. The use of the lanyards $h$ is to haul the mouth of the bag portion of the net up to the booms A B; that of the lanyards $f$ is to effect the same object with the outside part of the flange, which part has a rod, $n$, to hold it spread out and to enable it to be raised evenly throughout its whole length. The lanyards $k$ are employed to haul the corners and side portions of the flange up to the same height with the booms, or up to the rings $m$, so that by the combined operation of the lanyards $f$ and $k$ the flange can be hauled up to the booms all around. $p$ shows a line attached to the centre of the bottom of the bag portion of the net on the inside. This is employed to turn the net inside out in order to deposit its contents on the vessel's deck or in any desired place.

Having thus indicated the different portions of my invention and made brief reference to the uses and objects thereof, I will now proceed to illustrate more fully the operation of the whole together. The flange D is attached to the vessel's side, at or near the water line, and may be of any suitable width, so as to sink the top of the net beneath the water as far as necessary. The net attached to the hooks $i$ and suspended from the booms, as described, is suffered to rest in the water with the flanges hanging down on three sides thereof, as illustrated in the drawing. When the fish have entered the bag portion of the net, C, and it is desired to haul the same on board the vessel, this is accomplished as follows: the flange D is first drawn up to the booms, or to the surface of the water, by the lanyards $f$ and $k$, as heretofore described, thus preventing the escape of the fish from the net. The outer side of the mouth of the bag portion is then drawn up to the booms by the lanyards $h$. All the lanyards being made fast as before indicated, the booms are next raised to a vertical position at the side of the vessel by means of the lanyards $b$, and these are then belayed, as before specified, near the bottom of the masts. The contents of the net are then emptied on deck by turning the bag inside out by pulling on the line $p$. The two rods J' J' on the mouth of the bag portion can be unhooked at $s\ s\ s\ s$ with a view to convenience in folding the net. Reversing this operation will again place the net in the water at the side of the vessel. The two lanyards $b$ may be operated on a single mast, as well as on two, by having a block with two trucks attached in the same manner as the blocks are in the case of two masts; or by having two blocks attached to a single mast.

I am aware of the issue of Letters Patent to Benjamin Merritt, jr., June 29, 1858, and numbered No. 20,725. In this invention the net has no flange; the hauling tackle is differently arranged, applied, and operated; the net has no emptying line, $p$; the net is immediately attached to the booms, which are arranged to move laterally; and the combination of the net with the side of the vessel, and its operation therewith, are different from that in my invention.

I do not claim combining a net, such as is described in the said Merritt's specification, with the hull of a vessel, so as to operate as therein described, neither do I claim spreading the net by two booms, two sprits, and two sets of hauling tackle. In my invention the net is spread by the rods J J J' J'. Neither do I claim a brailing line and lifting tackle combined with a net, such as is therein described; but what I do claim, and desire to secure by Letters Patent, is—

The flange D, in combination with and when attached to the net or bag C, suspended and operated in the manner herein described as and for the purposes set forth.

CHARLES C. CROSMAN.

Witnesses:
WILLIAM H. CLIFFORD,
HENRY C. HOUSTON.